Patented Oct. 18, 1949

2,485,099

UNITED STATES PATENT OFFICE 2,485,099

HALOGEN-CONTAINING DERIVATIVES OF DICARBOXYLIC ACIDS

Morris S. Kharasch, Chicago, Ill., assignor to United States Rubber Company, New York, N. Y., a corporation of New Jersey No Drawing. Application October 25, 1947, Serial No. 782,220

6 Claims. (Cl. 260—485)

This invention relates to the synthesis of a new class of chemicals which are dialkyl esters of alpha-bromo-beta-trichloromethyl succinic acid by the free radical initiated addition of trichlorobromomethane to dialkyl esters of one of the alpha, beta-ethylene dicarboxylic acids maleic and fumaric.

Organic compounds containing olefinic unsaturation can be caused to react with trichlorobromomethane so as to form simple one to one adducts which contain in each molecule the constituent atoms from one and only one molecule of the olefinic compound and the constituent atoms from one and only one molecule of trichlorobromomethane. The methods of carrying out this reaction and the products obtained thereby are described more fully in my copending application Serial No. 696,941, filed September 13, 1946, now Patent No. 2,468,208, dated April 26, 1949. I have now found that trichlorobromomethane can be caused to react with dialkyl esters of either fumaric or maleic acid to form useful halogen containing compounds which are one to one adducts of trichlorobromomethane and the ethylene dicarboxylic acid and have the type formula

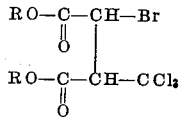

in which R is a saturated aliphatic hydrocarbon radical. This product may be easily dehydrobrominated to give a mixture of isomers having the type formula

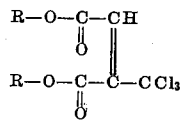

This dehydrobrominated product, when hydrolyzed completely, loses $CO_2$ and is converted into fumaric acid.

In the course of the reaction producing the alpha-bromo-beta-trichloromethyl dialkyl succinate there is also produced a smaller quantity of a compound which is the adduct of one molecule of the alpha-bromo-beta-trichloromethyl dialkyl succinate and one molecule of the dialkyl alpha, beta-ethylenedicarboxylic acid having the type formula

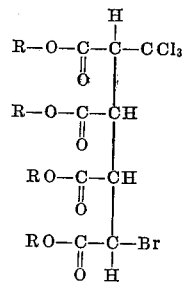

This compound can be dehydrobrominated to yield a 1,1,1-trichloro-2,3,4,5-tetracarboalkoxy pentene-4 which can be hydrogenated, hydrolyzed and decarboxylated to yield tetracarboxylic acid.

In the process of producing the dialkyl esters of alpha-bromo-beta-trichloromethyl succinic acid and the tetra alkyl esters of 1,1,1-trichloro-5-bromo-2,3,4,5-tetracarboxylic acid, a mixture containing trichlorobromomethane and a dialkyl ester of either fumaric or maleic acid is subjected to the action of a free radical reaction initiator such as either actinic light or a peroxide polymerization catalyst until the adducts are formed which may then be isolated as by fractional distillation.

Actinic light either visible or ultraviolet, i. e., in frequency ranging from about 2500 Å. to about 5000 Å. is preferred as the free radical reaction initiator although peroxidic polymerization catalysts such as the diacyl peroxides may be employed equally well. Suitable peroxidic polymerization catalysts are, for example, the diacyl peroxides such as dibenzoyl and diacetyl peroxide, tertiary butyl hydroperoxide, hydrogen peroxide, alkali peroxysulfates and the like.

Suitable dialkyl esters of ethylene alpha, beta-dicarboxylic acids are the dialkyl fumarates and dialkyl maleates.

Suitable dialkyl fumarates are those of the lower aliphatic alcohols containing from 1 to 6 carbon atoms although esters of higher alcohols may be used. Exemplary of such dialkyl fumarates are diisopropyl fumarate, di-n-butyl fumarate, diisobutyl fumarate, ditert-butyl fumarate, the various diamyl fumarates, and the various dihexyl fumarates. Mixed types may be employed such as methyl ethyl fumarate, methyl isopropyl fumarate, methyl hexyl fumarate, ethyl isopropyl fumarate, etc.

Since in the reaction the dialkyl maleates are converted into the corresponding fumarates, it can be seen that the corresponding maleate esters can be used equally well.

These reactions may be summarized by the following series of equations:

(1) RO—C—CH=CH—C—OR + ·CCl₃ ⟶
    ‖          ‖
    O          O
    I

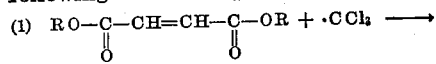
II (2) Cl₃CBr + RO—C—CH—CH—C—OR ⟶
              ‖          ‖
              O   ĊCl₃   O
                    II

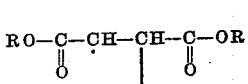
III (3) 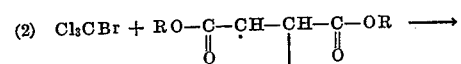 ⟶

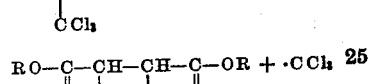
IV (4) ROC—CH—CH—C—OR
    ‖          ‖
    O   ĊCl₃   O        + BrCCl₃ ⟶
    RO—C—CH—CH—C—OR
    ‖          ‖
    O          O
    IV

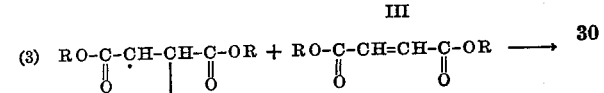
V (5) RO—C—CHBr—CH—C—OR ⟶
    ‖              ‖
    O      ĊCl₃    O
    III

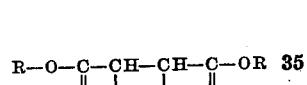
VI (6) ROC—CH=C—C—OR + 4H₂O ⟶
    ‖        ‖
    O  ĊCl₃  O
    VI

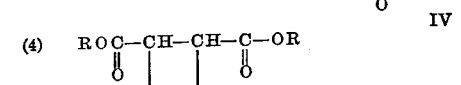
+ CO₂ + 3HCl + 2ROH (7) ROC—CH—CH—COR
    ‖          ‖
    O   ĊCl₃   O         ⟶
    ROC—CH—CH—C—OR
    ‖          ‖
    O    Br    O
    V

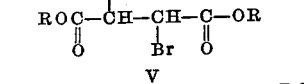
VII (8) ROC—CH—CH—COR
    ‖   ĊCl₃   ‖
    O          O         + 3NaOR ⟶
    ROC—C=CH—COR
    ‖          ‖
    O          O
    VII

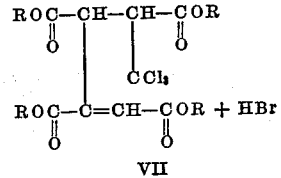 + 3NaCl
VIII (9) 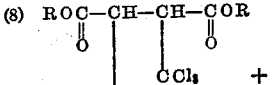 + H₂O ⟶
VIII

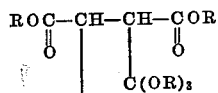 + 2ROH
IX

(10) ROC—CH—CH—COR
     ‖          ‖
     O   ĊOR    O         + H₂ ⟶
                ‖
                O
     ROC—C=CH—COR
     ‖          ‖
     O          O
     IX

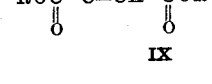
X

(11) ROC—CH—CH—C—OR
     ‖          ‖
     O   ĊOR    O         + 5H₂O ⟶
                ‖
                O
     ROC—CH—CH₂—C—OR
     ‖           ‖
     O           O
     X

CH₂—COOH
ĊH—COOH   + CO₂ + 5ROH
ĊH—COOH
ĊH₂—COOH
XI

Equation 1 represents the addition of a free trichloromethyl radical to a dialkyl ester of an alpha, beta-ethylenedicarboxylic acid 1 to form a dialkoxy trichloromethylsuccinyl free radical which as in Equation 2 can remove a bromine atom from bromotrichloromethane to form an alpha - bromo - beta - trichloromethyl - succinate ester (III) and generate a free trichloromethyl radical which can participate in the reaction of Equation 1 and so give rise to a chain reaction. One of the trichloromethyl dialkoxysuccinyl free radicals (II) formed according to Equation 1 can add to a molecule of dialkyl ethylenedicarboxylic acid to form the radical (IV) as shown by Equation 3. This free radical (IV) can then remove a bromine atom from bromotrichloromethane to form a molecule of a tetraalkyl ester of 1,1,1-trichloro-5-bromo-2,3,4,5-pentane tetracarboxylic acid (V) and generate a free trichloromethyl radical as shown by Equation 4. The free trichloromethyl radical formed by Reaction 3 can by participating in either Reaction 1 or 3 serve to initiate a chain reaction. Equation 5 illustrates the dehydrobromination of the alpha-bromo-beta-trichloromethylsuccinate ester III to form the dialkyl ester of beta-trichloromethyl-alpha, beta-ethylene-dicarboxylic acid (VI). Equation 6 illustrates the hydrolysis and decarboxylation of product (VI) to give fumaric acid. Equation 7 illustrates the dehydrobromination of the tetralkyl ester of 1,1,1,-trichloro-5-bromo-2,3,4,5-pentane tetracarboxylic acid (V) to give 1,1,1 - trichloro-4-pentene-2,3,4,5-tetracarboxylic acid (VII). Equation 8 illustrates the conversion of VII to the orthoester VIII by reaction with sodium alcoholate. Equation 9 illustrates the conversion of the orthoester VIII to the penta-ester IX by partial hydrolysis. Equation 10 illustrates the hydrogenation of the penta-ester to give the alkyl ester of 2,2,3,4,5-pentane-pentacarboxylic acid X. Equation 11 illustrates the hydrolysis and decarboxylation of X to give 1,2,3,4-butane tetracarboxylic acid XI.

The initial formation of the free trichloromethyl radicals necessary for step 1 may take place according to either of the following two sets of equations:

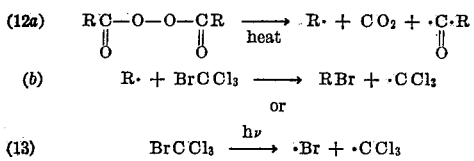

(12a) $RC-O-O-CR \xrightarrow{heat} R\cdot + CO_2 + \cdot C\cdot R$ (b) $R\cdot + BrCCl_3 \longrightarrow RBr + \cdot CCl_3$ or

(13) $BrCCl_3 \xrightarrow{h\nu} \cdot Br + \cdot CCl_3$

Equation 12a represents the thermal decomposition of a diacyl peroxide to give free organic radicals which can react as in 12b to remove a bromine atom from trichlorobromomethane to generate a free trichloromethyl radical. Equation 13 represents the photochemical decomposition of trichlorobromomethane to give a bromine radical and a trichloromethyl radical.

The following examples are illustrative of my invention:

EXAMPLE 1

*Photochemical induced addition of bromotrichloromethane to dimethyl fumarate*

A mixture of bromotrichloromethane (198 g., 1.0 mole) and dimethyl fumarate (36 g., 0.25 mole) is internally irradiated by a mercury vapor neon, fluorescent tube for twenty-four hours. The temperature of the reactants is maintained at 50-60° C. by the illuminating coil. The undissolved, crystalline fumarate ester completely disappears in fifteen hours. Unreacted bromotrichloromethane (155 g.) is recovered by distillation at 101-104° C. at atmospheric pressure. Further distillation of the viscous residue (75.5 g.) at 0.1 mm. yields 2 g. of unchanged dimethyl fumarate at 75-90° C. a colorless oil (fraction I) (57 g.) at 95-108° C. which partly solidifies and a viscous, light yellow oil (fraction II) (11.9 g.) at 180-185° C. A black, viscous residue (4.1 g.) remains. Hydrogen bromide is evolved during the latter part of the distillation.

The solid from fraction I is separated from the oil and after twice recrystallizing from methanol gives a white crystalline solid (M. P. 54-55° C.) with a halogen analysis consistent with 1,1,1-trichloro-3-bromo-2,3-di-carbomethoxypropane.

Anal. Calcd. for $C_7H_8O_4BrCl_3$: Ag equiv., 85.6. Found: Ag equiv., 64.8.

EXAMPLE 2

*Photochemical-induced addition of bromotrichloromethane to dimethyl maleate*

A mixture of bromotrichloromethane (132 g., 0.66 mole) and dimethyl maleate (48 g., 0.33 mole) is internally irradiated by a mercury vapor neon, fluorescent tube for twenty-four hours. The temperature of the reactants is maintained at 50-60° C. by the illuminating coil. A crystalline deposit begins forming on the walls of the outside tube after one hour, reaching a maximum quantity in four hours, and nearly completely disappearing after twenty-four hours. The reaction mixture is cooled and filtered from 13 g. of crystallized dimethyl fumarate. Unreacted bromotrichloromethane (84 g.) is recovered by distillation at 101-103° C. at atmospheric pressure. Further distillation of the higher boiling residue at .2 mm. yields 1.5 g. of dimethyl fumarate but no dimethyl maleate. A colorless liquid (34.7 g.) which later solidifies (M. P. 53-55° C.) distills at 110-120° C. and gives no lowering of the melting point on mixture with the white solid from fraction I of Example 1. A light yellow viscous oil (8.5 g.) distills at 180-190° C. with evolution of hydrogen bromide.

EXAMPLE 3

*Identification of bromotrichloromethane-dimethyl fumarate addition product. (1,1,1-trichloro-3-bromo-2,3-dicarbomethoxypropane)*

The crystalline addition product from fraction I, Example 1, has a molecular weight of 341.0 as indicated by the benzene freezing-point lowering method. The calculated molecular weight of $C_7H_8O_4BrCl_3$ is 342.5. On treatment of the addition product (10 g.) with an equimolar amount of sodium methylate in methanol under nitrogen, the temperature rises to 60° C. and solid sodium bromide separates. After three hours of intermittent refluxing water is added to the mixture followed by ether extraction. On distillation of the ether extract, a water-white, slightly viscous oil (6.3 g.) ($n_d^{20}$ 1.4845) distills at 75-80° C. at .1 mm.

Anal. calcd. for $C_7H_7O_4Cl_3$: Cl, 40.8; found: Cl, 41.2. Molecular wgt. calcd. for $C_7H_7O_4Cl_3$: 261.5; found: 262.9.

Hydrolysis of the white solid (4 g.) using 70% sulfuric acid gives a yellow, turbid solution which is diluted with water and extracted with ether using a continuous extractor. The crystalline extract (0.11 g.) remaining after evaporation of the ether is decolorized over charcoal and recrystallized from methanol. These crystals melt at 284–287° C. and do not depress the melting point of an authentic sample of fumaric acid.

EXAMPLE 4

*Identification of dimethyl fumarate-bromotrichloromethane 2:1 addition product. (1,1,1-trichloro-5-bromo-2,3,4,5-tetracarbomethoxypentane)*

Molecular weight determination on the 2:1 addition product (fraction II) of Example 1 indicates that some hydrogen bromide may have split out at the high temperature of the distillation. Treatment of 10.5 g. of the addition product in the cold with one-third mole ratio of sodium methylate in methanol for one hour yields a precipitate of sodium bromide. Extraction of the water-diluted solution with ether gives a tar, 5.5 g. of which distills at 175–180° C. at .1 mm. and has a halogen analysis consistent with 1,2,3,4-tetracarbomethoxy-5,5,5-trichloropentene-1.

Anal. calcd. for $C_{13}H_{15}O_8Cl_3$: Cl, 26.3; found: Cl, 26.6. Molecular wgt. calcd. for $C_{13}H_{15}O_8Cl_3$: 405.5; found: 404.0.

4.0 g. of the unsaturated 2:1 addition product VII is refluxed with a 4.5 mole ratio of sodium methylate in methanol under nitrogen for six hours. The crystalline sodium chloride is separated and the orthoester decomposed by acidification with acetic acid. The reaction mixture diluted with water is extracted with ether and the oily extract distilled at 145–155° C. at .2 mm. The penta-ester distillate (.3259 g.) is quantitatively hydrogenated using Adams catalyst.

Quant. hydrog. calcd. for $C_{13}H_{19}O_{10}$: 21.0 ml., std. condits. Absorbed: 19.2 ml., std. condits.

The hydrogenated penta-ester is hydrolyzed and decarboxylated by refluxing in dilute hydrochloric acid. After extracting with ether and evaporation of the ether, a white solid (.11 g.) melting at 185–186° C. remains. Auwers (Ber., 26, 364 (1893)) lists the melting point of 1,2,3,4-butane tetracarboxylic acid at 189°. The acid (.0986 g.) gives a neutral equivalent of 63.4 using phenolphthalein indicator and 15.49 ml. of .1012 N sodium hydroxide.

EXAMPLE 5

A mixture containing 198 grams of bromotrichloromethane, 36 grams of dimethyl maleate, and 0.65 gram of benzoyl peroxide is heated to between 80 and 90° C. for three hours. At the end of that time 25.0 grams of dimethyl fumarate, 2.5 grams of dimethyl maleate, 11.3 grams of a product identical with fraction I of Example 1 and 3.6 grams of a product identical with fraction II of Example 1 are isolated.

EXAMPLE 6

A mixture containing 198 grams of bromotrichloromethane, 36 grams of dimethyl fumarate, and 0.65 grams of benzoyl peroxide is heated to 80–90° C. for three hours. At the end of that time 10.5 grams of unreacted dimethyl fumarate, 39.8 grams of a product identical with fraction I of Example 1, and 9.2 grams of a product identical with fraction II of Example 1 are isolated.

I claim:

1. The process of producing 1,1,1-trichloro-3-bromo-2,3-dicarbalkoxy propanes and 1,1,1-trichloro-5-bromo-2,3,4,5-tetracarbalkoxy pentanes which comprises maintaining trichlorobromomethane and a dialkyl ester of one of the ethylene alpha, beta-dicarboxylic acids maleic and fumaric in contact with a peroxidic polymerization catalyst until 1,1,1-trichloro-3-bromo-2,3-dicarbalkoxy propane and 1,1,1-trichloro-5-bromo-2,3,4,5-tetracarbalkoxy pentane are formed.

2. A chemical chosen from the class consisting of 1,1,1-trichloro-3-bromo-2,3-dicarbalkoxy propane; 1,1,1-trichloro-5-bromo-2,3,4,5-tetracarbalkoxy pentane and their dehydrobrominated derivatives.

3. A chemical which is a 1,1,1-trichloro-3-bromo-2,3-dicarbalkoxy propane having the type formula

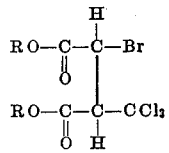

wherein R is a saturated hydrocarbon radical containing from 1 to 6 carbon atoms.

4. The chemical 1,1,1-trichloro-3-bromo-2,3-dicarbomethoxy propane.

5. The chemical 1,1,1-trichloro-2,3-dicarbomethoxy propene-2.

6. The chemical 1,2,3,4-tetracarbomethoxy-5,5,5-trichloro pentene-1.

MORRIS S. KHARASCH.

REFERENCES CITED

The following references are of record in the file of this patent:

UNITED STATES PATENTS

| Number | Name | Date |
|---|---|---|
| 2,199,799 | Jacobson | May 7, 1940 |
| 2,297,351 | Gerhart | Sept. 29, 1942 |
| 2,313,501 | Bachman | Mar. 9, 1943 |
| 2,394,512 | Coleman | Feb. 5, 1946 |